United States Patent
Park

(10) Patent No.: US 6,186,603 B1
(45) Date of Patent: Feb. 13, 2001

(54) SOLENOID-SUPPORTING DEVICE FOR ANTILOCK BRAKE SYSTEM

(75) Inventor: Kyung-Ill Park, Pyungtak (KR)

(73) Assignee: Mando Machinery Corporation, Gunpo (KR)

( * ) Notice: Under 35 U.S.C. 154(b), the term of this patent shall be extended for 0 days.

(21) Appl. No.: 09/211,467

(22) Filed: Dec. 14, 1998

(30) Foreign Application Priority Data

Dec. 30, 1997 (KR) .................................................. 97-78454

(51) Int. Cl.$^7$ ...................................................... B60T 8/36
(52) U.S. Cl. ............................... 303/119.3; 303/DIG. 10; 267/161
(58) Field of Search .............................. 303/119.3, 119.2, 303/DIG. 10; 267/157, 160, 161, 163

(56) References Cited

U.S. PATENT DOCUMENTS

| | | | |
|---|---|---|---|
| 3,589,703 | * 6/1971 | Brookman | 267/162 |
| 4,400,861 | * 8/1983 | Parker | 29/173 |
| 5,439,279 | * 8/1995 | Linkner, Jr. et al. | 303/119.2 |
| 5,462,344 | 10/1995 | Jakob et al. . | |
| 5,482,362 | * 1/1996 | Robinson | 303/119.2 |
| 5,779,221 | * 7/1998 | Staib et al. | 251/129.15 |
| 5,820,228 | * 10/1998 | Schneider et al. | 303/119.3 |
| 5,921,639 | * 7/1999 | Hosoya | 303/119.2 |
| 5,988,770 | * 11/1999 | Volz | 303/119.3 |
| 6,000,679 | * 12/1999 | Reuter et al. | 251/129.15 |
| 6,048,041 | * 4/2000 | Mueller et al. | 303/119.2 |

FOREIGN PATENT DOCUMENTS

WO97/10979 * 3/1997 (WO) .

* cited by examiner

Primary Examiner—Christopher P. Schwartz
Assistant Examiner—Bradley King
(74) Attorney, Agent, or Firm—Ladas & Parry

(57) ABSTRACT

There is disclosed a solenoid-supporting device for an antilock brake system by which the vibration and noise created from solenoid valves are attenuated and the heat generated from the solenoid valves are effectively radiated. The solenoid-supporting device comprises: a base plate contacting the bottom surface of a modulator block; a plurality of penetration holes formed at the base plate in order that valve bodies pass through the penetration holes and are combined with solenoids; and a plurality of elastic members which are made by extending from the base plate around the respective penetration holes in order to urge the solenoids to the ECU housing.

4 Claims, 8 Drawing Sheets

SOLENOID-SUPPORTING DEVICE FOR ANTILOCK BRAKE SYSTEM

BACKGROUND OF THE INVENTION (1) Field of the Invention

This invention relates to an antilock brake system, and more specifically a solenoid-supporting device for an antilock brake system by which the vibration and noise, which are created from solenoid valves when a vehicle runs, are attenuated and the heat generated from the solenoid valves are effectively radiated, thereby preventing the damage of the solenoid valves' coils.

(2) Description of the Prior Art

In general, an antilock brake system is an apparatus for securing the steering stability and driving power through the prevention of the slippage of a running vehicle. It provides the stable brake effect by properly controlling the braking pressure exerting to each wheel when braking a vehicle.

FIG. 1 is a schematic hydraulic circuit diagram of a general antilock brake system. As shown in the figure, brakes 6 generating a braking power by means of a hydraulic pressure are mounted on the respective wheels 5, and a brake pedal 1 is provided at the driver's seat. The brake pedal 1 is connected with a pressure booster 2 for boosting the braking pressure, an oil storage tank 4 for storing the brake oil, and a master cylinder 3 for compressing the oil in the oil storage tank 4 at a high pressure through the boosting pressure of the pressure booster 2 and transmitting it to the brake 6.

At the inlet and outlet of each brake 6 are mounted a normal open type solenoid valve 7 and a normal close type solenoid valve 8 for controlling the flow of the hydraulic oil, respectively. The operation of the solenoid valves 7 and 8 is controlled by an ECU 20 which detects a vehicle's speed through a wheel sensor 9 mounted on the wheel 5.

At the downstream of the normal close type solenoid valve 8 are mounted a low pressure accumulator 11 and a high pressure accumulator 12 for temporarily storing the oil discharged from the brake 6. Between the low pressure accumulator 11 and the high pressure accumulator 12 is mounted a pump 13 that pumps the oil in the low pressure accumulator 11 to the high pressure accumulator 12.

The low and high pressure accumulators 11 and 12, the pump 13, and the normal open and close type solenoid valves 7 and 8 are housed in the inside of a modulator 30, and the ECU 20 is mounted on the underside of the modulator 30. Such a structure of the modulator 30 will be described with reference to FIGS. 7 and 8. Hereinafter, the normal open type solenoid valve 7 and the normal close type solenoid valve 8 will be indicated as only a solenoid valve 7.

The modulator 30 includes a block 31 of an aluminum alloy material in which the solenoid valves 7 are mounted. The ECU 20 includes a housing 21 having four side walls and a printed circuit board 23 which is mounted at a space 22 formed at a lower portion of the housing 21. The four corners of the housing 21 are fastened to those of the modulator block 31 by bolts 24.

The solenoid valve 7 comprises a solenoid 7a which creates an electric field by an applied electric power and a valve body 7b which opens or closes an oil passage formed therein by interacting with the electric field created by the solenoid 7a. The solenoid 7a is mounted on the housing 21 of the ECU 20 and the valve body 7b is mounted on the block 31 of the modulator 30. The solenoid 7a includes wounded coils 17 and a yoke 18 enclosing the coils 17, and wires 19 which extend outside to be connected to the printed circuit board 23.

Between the modulator block 31 and the ECU housing 21 is provided a supporting device 40 for urging the solenoids 7a to the ECU housing 21 to prevent the vibration and noise caused by the movement of the solenoids 7a in the ECU housing 21. The supporting device 40 comprises a base plate 41 which contacts the bottom surface of the modulator block 31 and a plurality of elastic members 42 which are branched off from the base plate 41 and bent downward at a given angle so as to contact the top surface of each solenoid 7a.

Thus, when the modulator block 31 is combined with the ECU housing 21, the valve bodies 7b pass through the spaces formed between the respective elastic members 42 and are fitted to the corresponding solenoids 7a, and the front ends of the elastic members 42, as shown in FIG. 8, support the solenoids 7a in a point contact with the top surfaces of the solenoids 7a.

However, such a solenoid-supporting device for an antilock brake system as aforementioned has a disadvantage in that it does not effectively radiate the heat generated from the solenoids during the operation of the solenoid valves because it supports the solenoids in a point contact with the solenoids. That is, when the solenoid valves operates, heat is generated from the solenoids. Thus, if the heat is not radiated effectively, it may cause the problems that the coils are burnt, and therefore the brake system does not operate.

SUMMARY OF THE INVENTION

This invention has been made in an effort to solve the above problems. It is an object of this invention to provide a solenoid-supporting device for an antilock brake system by which the vibration and noise, which are created from solenoid valves when a vehicle runs, are attenuated and the heat generated from the solenoid valves is effectively radiated, thereby preventing the damage of the solenoid valves' coils.

To achieve the above object, this invention is characterized in that in an antilock brake system which comprises: brakes mounted on each wheel of a vehicle; a master cylinder for transmitting hydraulic oil to the brakes to generate a braking power; a plurality of solenoid valves for controlling the flow of the hydraulic oil supplied from the master cylinder, each of which comprises a solenoid for creating an electric field and a valve body for opening or closing an oil passage formed therein by interacting with the electric field created by the solenoid; an ECU for controlling the solenoid valves; a modulator block in which the valve bodies are mounted; an ECU housing joined to the bottom of the modulator block, in which the solenoids are mounted; and a solenoid-supporting device provided between the modulator block and the ECU housing for supporting the solenoids, the solenoid-supporting device comprises: a base plate contacting the bottom surface of the modulator block; a plurality of penetration holes formed at the base plate in order that the valve bodies pass through the penetration holes and are combined with the solenoids; and a plurality of elastic members which are made by extending from the base plate around the respective penetration holes in order to urge the solenoids to the ECU housing.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1:
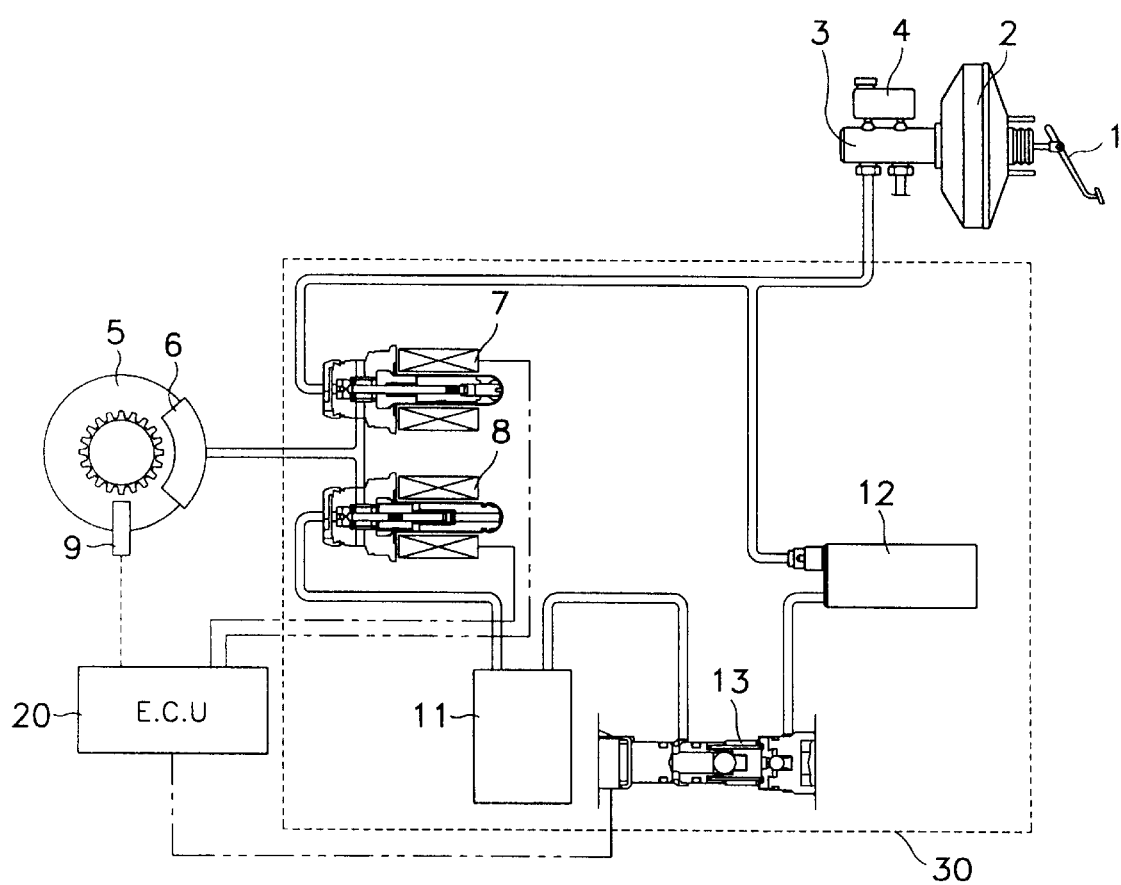
FIG. 1 is a schematic hydraulic circuit diagram of a general antilock brake stem.

A preferred embodiment of the present invention will now be described in detail with reference to the accompanying drawings. The same parts as that in the prior art will be designated as the same reference numerals and there will be no any detailed description therefor.

Figure 2:
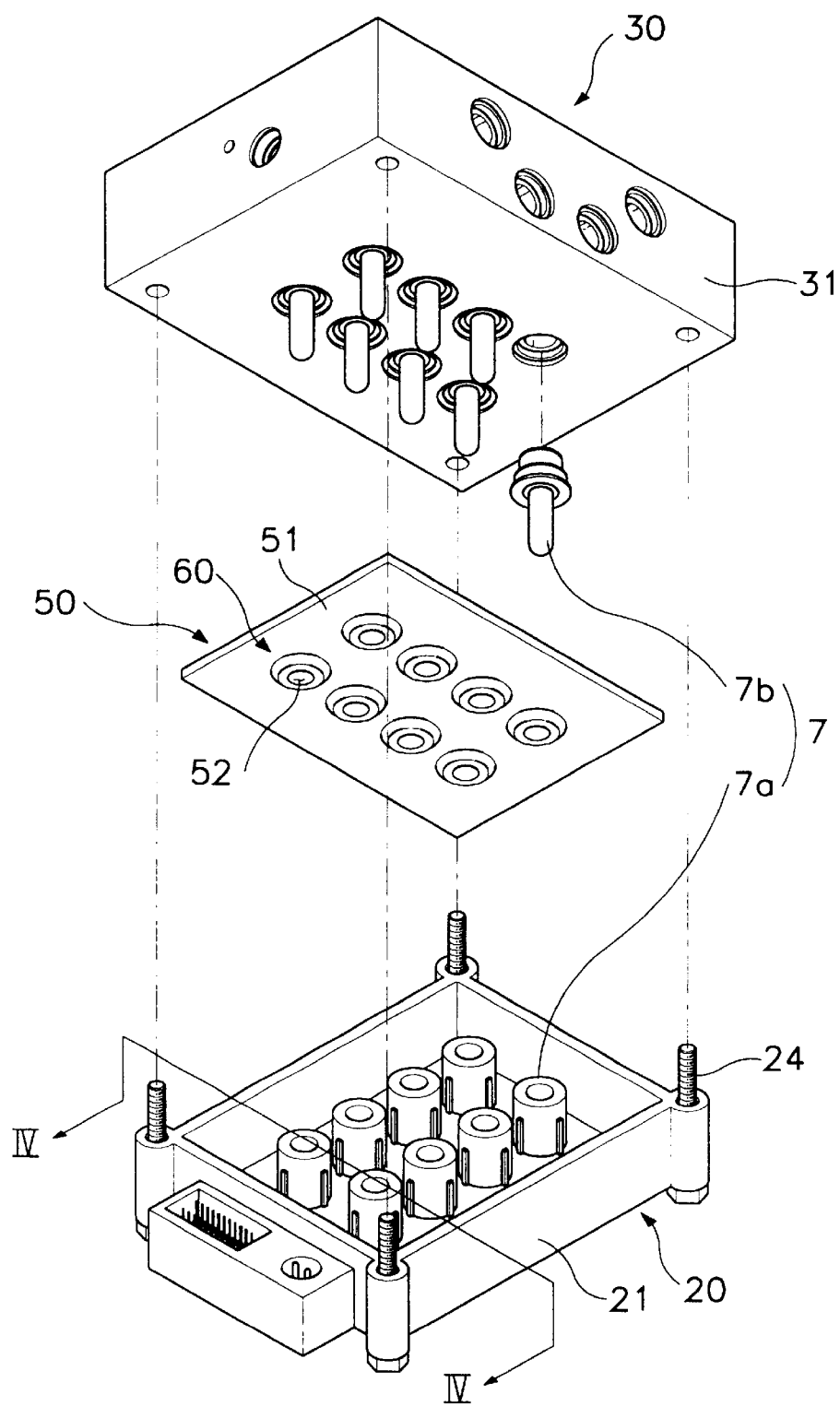
FIG. 2 is an exploded perspective view showing the structure of the modulator and ECU housing of an antilock brake system according to this invention.

First, the first embodiment of this invention will be described in detail with reference to FIGS. 2, 3 and 4.

The modulator 30 of an antilock brake system according to this invention comprises the block 31 of an aluminum alloy material, a plurality of the solenoid valves 7, the pump 13, and the low and high pressure accumulators 11 and 12.

On the underside of the modulator 30 is mounted the ECU 20. The ECU 20 includes a housing 21 having four side walls and a printed circuit board 23 which is mounted at a space 22 formed at a lower portion of the housing 21. The four corners of the housing 21 are fastened to those of the modulator block 31 by bolts 24.

The solenoid valve 7 comprises a solenoid 7a which creates an electric field by an applied electric power and a valve body 7b which is combined with the solenoid 7a and opens or closes an oil passage formed therein by interacting with the electric field created by the solenoid 7a. The solenoid 7a is mounted on the housing 21 of the ECU 20 and the valve body 7b is mounted on the block 31 of the modulator 30. The solenoid 7a includes wounded coils 17 and a yoke 18 enclosing the coils 17, and wires 19 which extend outside to be connected to the printed circuit board 23.

Between the modulator block 31 and the ECU housing 21 is provided a supporting device 50 for urging the solenoids 7a to the ECU housing 21 to prevent the vibration and noise caused by the movement of the solenoids 7a in the ECU housing 21.

The solenoid-supporting device, which is of a rectangular metal to serve as a plate spring, comprises: a base plate 51 contacting the bottom surface of the modulator block 31; a plurality of penetration holes 52 formed at the base plate 51 in order that the valve bodies 7b pass through the penetration holes 52 and are combined with the solenoids 7a ; and a plurality of elastic members 60 which are made by extending from the base plate 51 around the respective penetration holes 52 in order to urge the solenoids 7a to the ECU housing 21.

Figure 3:
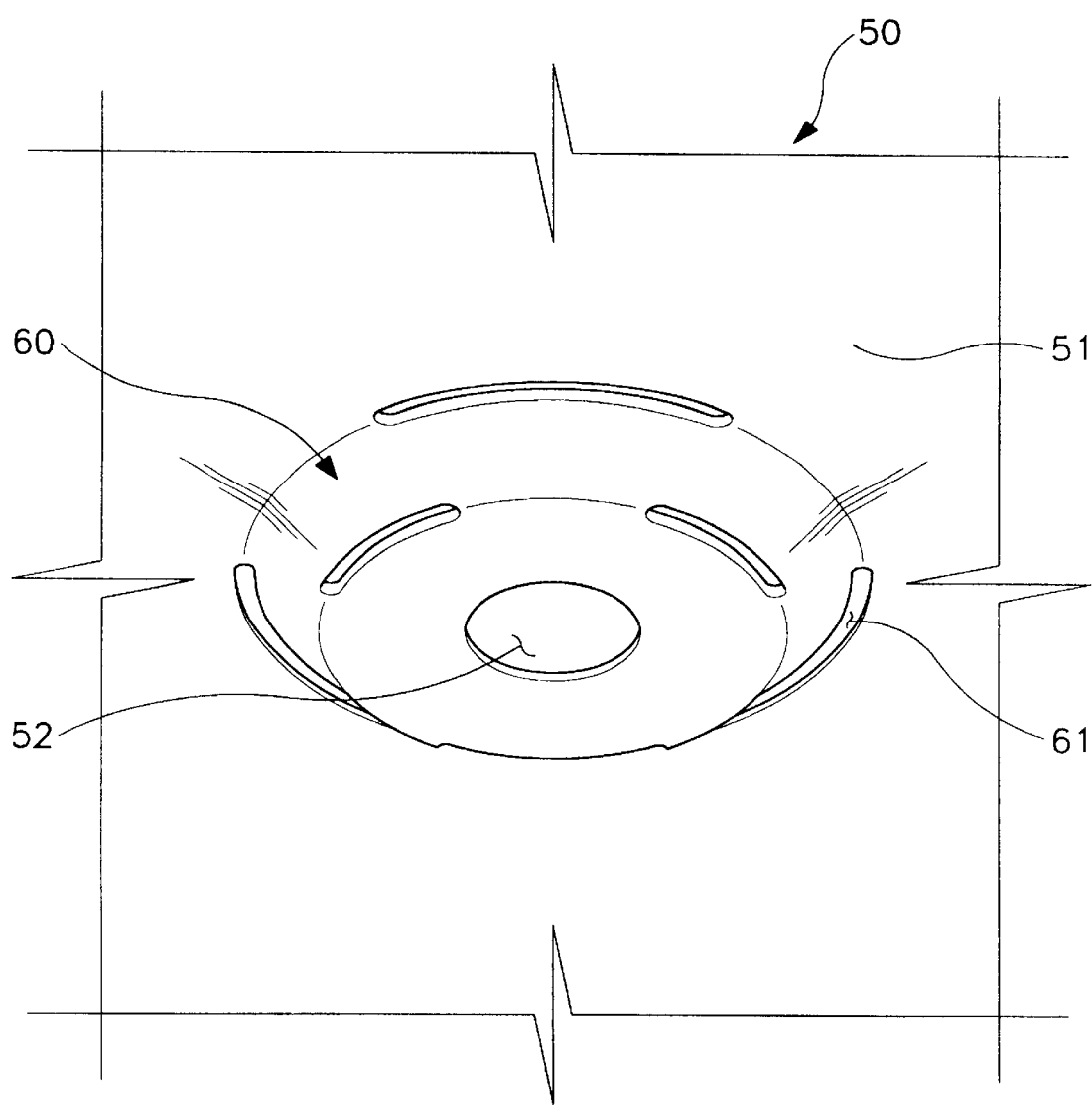
FIG. 3 is an expanded perspective view of an elastic member of a solenoid-supporting device according to a first embodiment of this invention.
Figure 4:
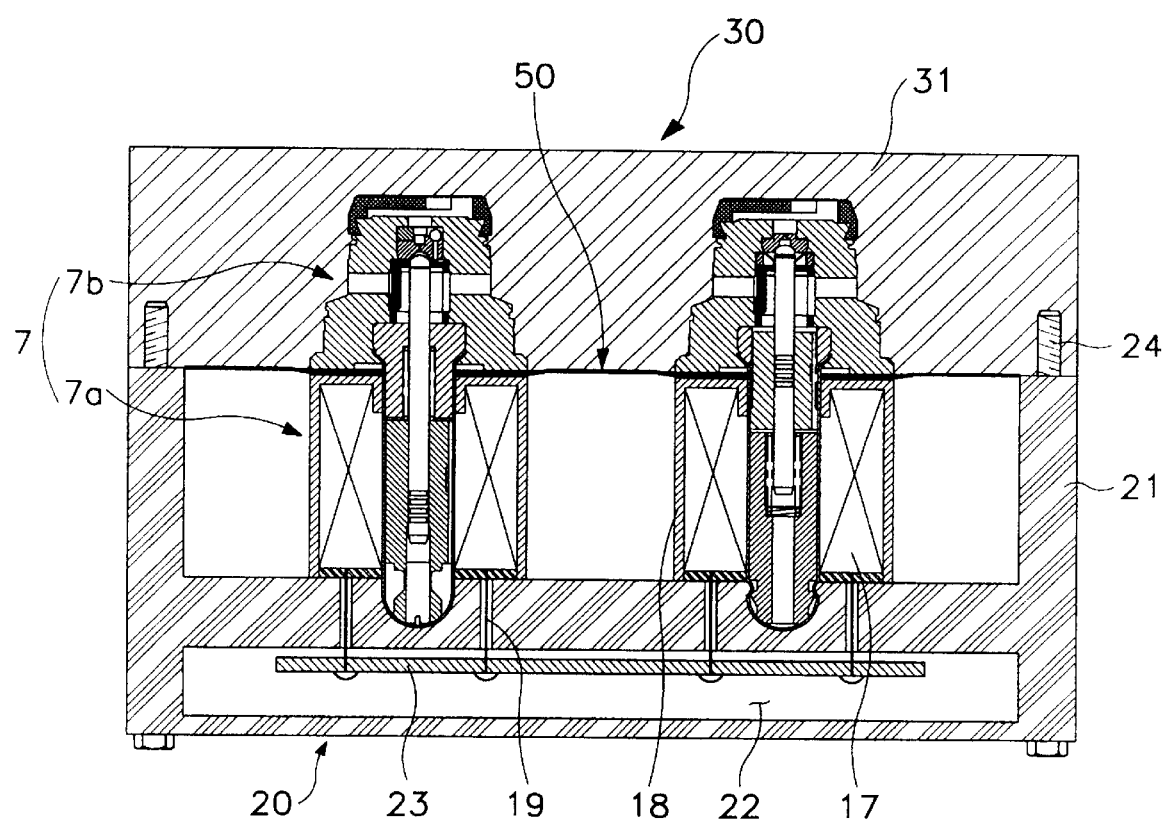
FIG. 4 is a cross-sectional view of the modulator and ECU housing in a combined state, taken along the line IV—IV in FIG. 2.

FIG. 3 is a perspective view showing a first embodiment of the elastic member 60 of such a solenoid-supporting device 50. As shown in the figure, the elastic member 60 extends from the base plate 51 toward the solenoid 7a, forming a concentric circle with the penetration hole 52 around the penetration hole 52. At the edge of the elastic member 60 are formed a plurality of slots 61 along the circumference thereof in order that the deformation of the base plate 51 is prevented during the forming work of the elastic member 60, and the elastic member 60 has a good elasticity. When such an elastic member 60 contacts the top surface of the solenoid 7a, not only the solenoid 7a is securely fixed in the ECU housing 21, but also the heat generated from the coils 17 during the operation of the solenoid valve 7 is effectively radiated by transferring to the base plate 51 and the modulator block 31 through the elastic member 60, thereby preventing the damage of the coils 17. That is, because all most of the surface of the solenoid-supporting device 50 is kept in a surface confact with the solenoid valves 7a and the modulator block 31, the heat generated from each solenoid 7a is easily emitted outside through the solenoid-supporting device 50 and the modulator block 31.

Figure 5:
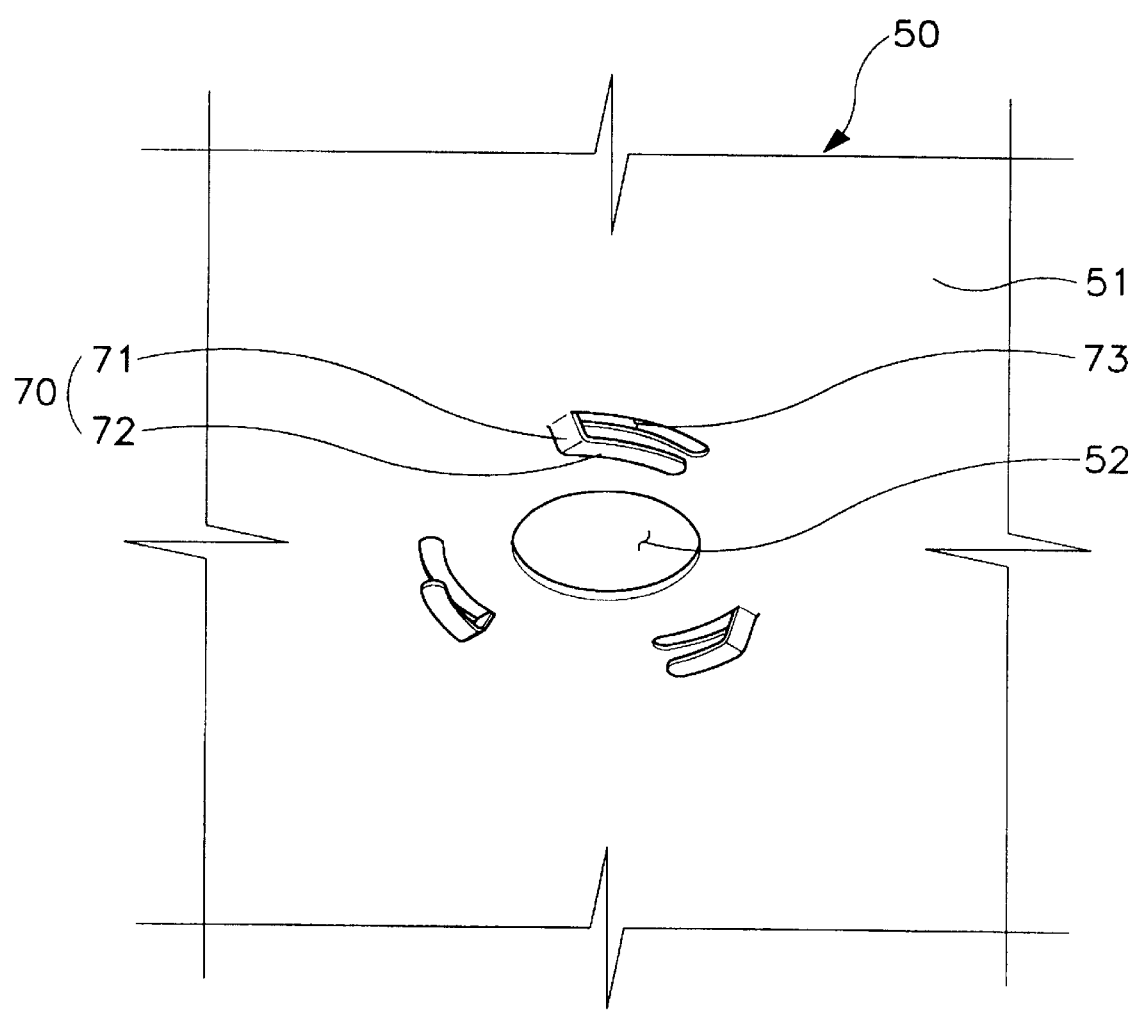
FIG. 5 is an expanded perspective view of an elastic member of a solenoid-supporting device according to a second embodiment of this invention.

Next, the second and third embodiments of the elastic members will be described in detail with reference to FIGS. 5 and 6. As shown in FIG. 5, the second embodiment has a plurality of elastic members 70 which are arranged at the circumference of the penetration hole 52 at regular intervals. Each elastic member 70 comprises a vertical portion 71 which is made by cutting out from the base plate 51, by which a slot 73 is formed on the base plate 51, and bending the cut portion vertically toward the solenoid 7a, and a horizontal portion 72 which is made by further bending a portion of the vertical portion 71 toward the slot 73 so as to parallel with the top surface of the solenoid 7a. Therefore, the elastic member 70 has a good elasticity by the vertical portion 71. Also, when the horizontal portion 72 of each elastic member 70 contacts the top surface of each solenoid 7a, not only the solenoid 7a is securely fixed in the ECU housing 21, but also the heat generated from the coils 17 during the operation of the solenoid valve 7 is effectively radiated by transferring to the base plate 51 and the modulator block 31 through the elastic members 70, thereby preventing the damage of the coils 17. That is, because all most of the surface of the solenoid-supporting device 50 is kept in a surface confact with the solenoid valves 7a and the modulator block 31, the heat generated from each solenoid 7a is easily emitted outside through the solenoid-supporting device 50 and the modulator block 31.

Figure 6:
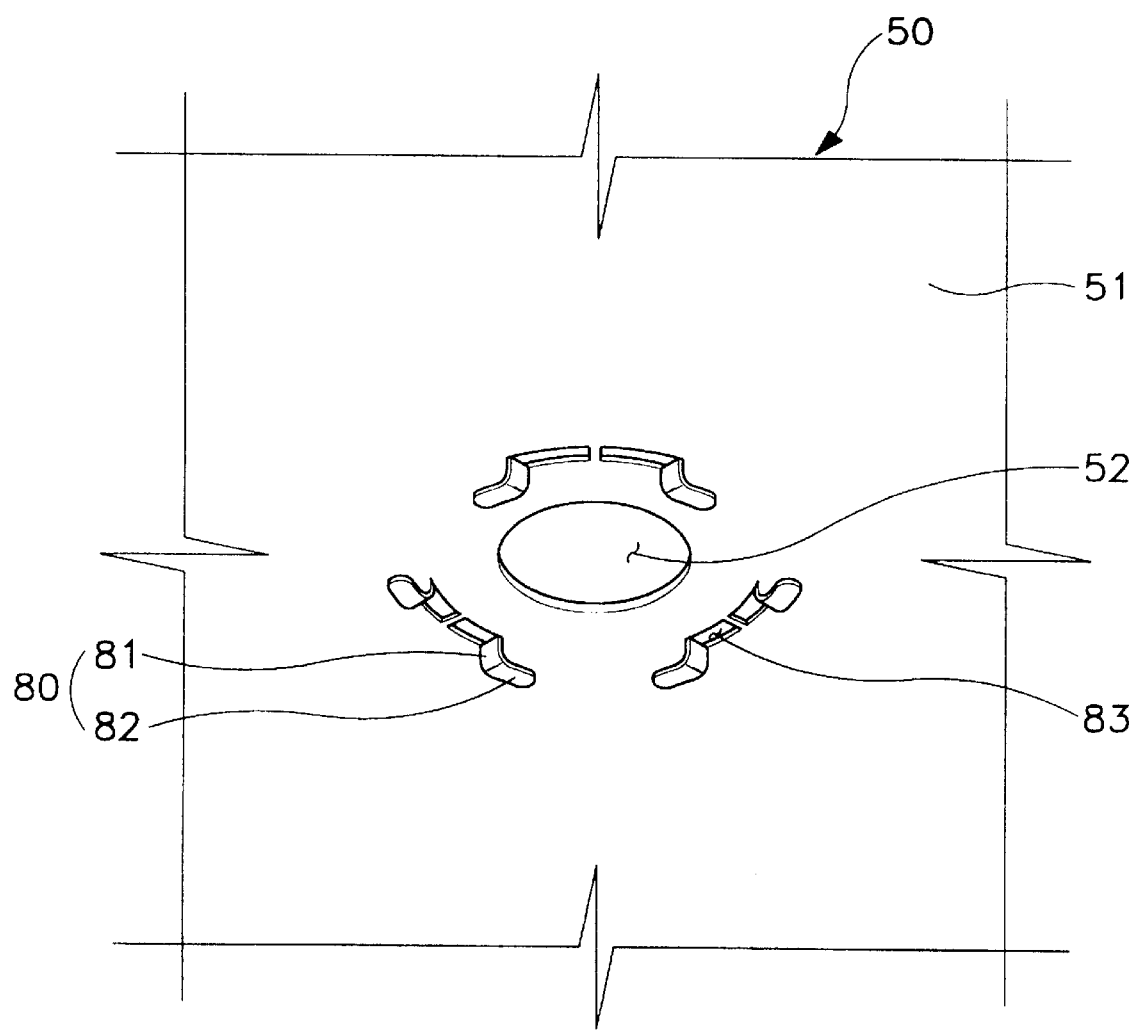
FIG. 6 is an expanded perspective view of an elastic member of a solenoid-supporting device according to a third embodiment of this invention.
Figure 7:
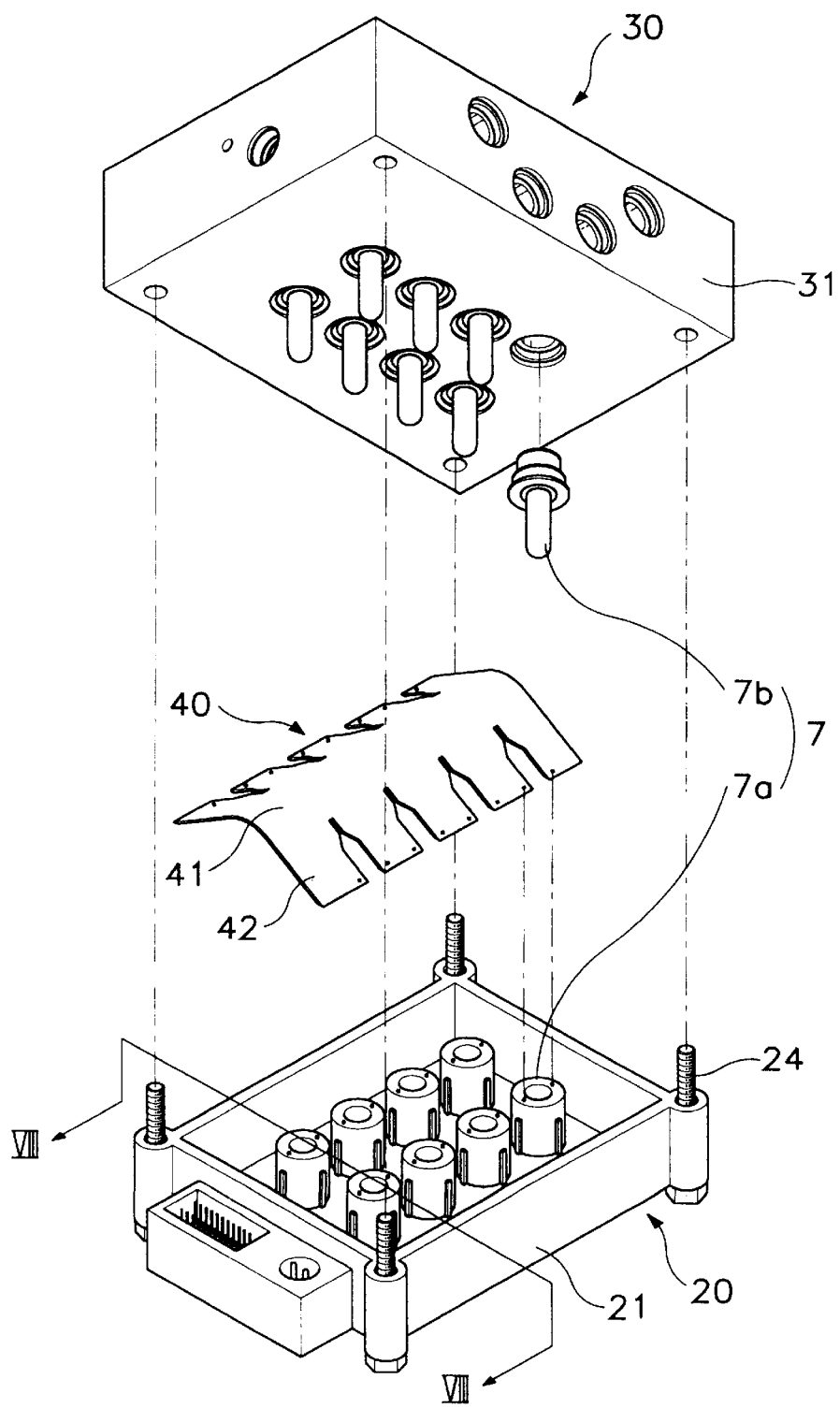
FIG. 7 is an exploded view showing the structure of conventional modulator and ECU housing of an antilock brake system.
Figure 8:
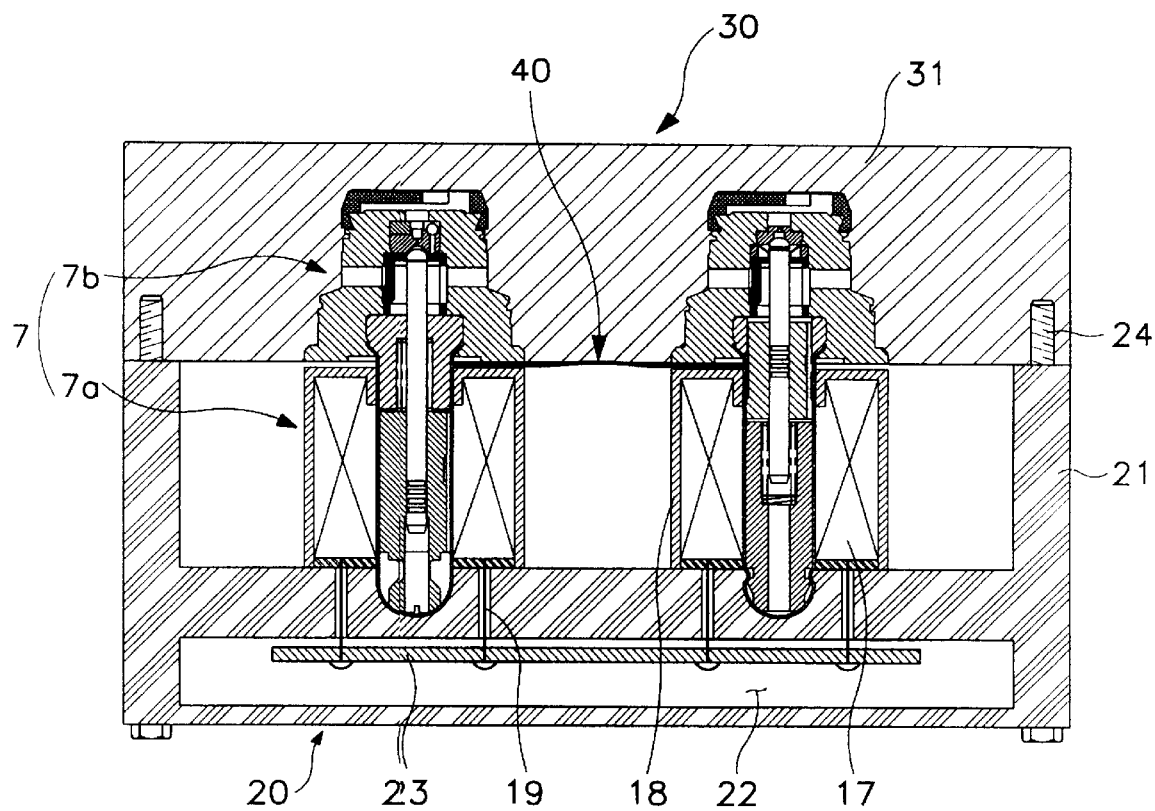
FIG. 8 is a cross-sectional view of the modulator and ECU housing in a combined state, taken along the line VIII—VIII in FIG. 7.

As shown in FIG. 6, the third embodiment has a plurality of elastic members 80 which are arranged at the circumference of the penetration hole 52 at regular intervals, as in the second embodiment. Each elastic member 80 consists of a vertical portion 81 which is made by cutting out from the base plate 51, by which a slot 83 is formed on the base plate 51, and bending the cut portion vertically toward the solenoid 7a, and a horizontal portion 82 which is made by further bending a portion of the vertical portion 81 toward the outside of the slot 83 so as to parallel with the top surface of the solenoid 7a. Therefore, the elastic member 80 has a good elasticity by the vertical portion 81. Also, when the horizontal portion 82 of each elastic member 80 contacts the top surface of each solenoid 7a, not only the solenoid 7a is securely fixed in the ECU housing 21, but also the heat generated from the coils 17 during the operation of the solenoid valve 7 is effectively radiated by transferring to the base plate 51 and the modulator block 31 through the elastic members 70, thereby preventing the damage of the coils 17. That is, because all most of the surface of the solenoid-supporting device 50 is kept in a surface confact with the solenoid valves 7a and the modulator block 31, the heat generated from each solenoid 7a is easily emitted outside through the solenoid-supporting device 50 and the modulator block 31. That is, the elastic device 70 according to the second embodiment and the elastic device 80 according to the third embodiment are the same in their construction and operation except that the horizontal portions 72 and 82 are bent toward the opposite directions for each other.

The assembly of the modulator 30 and ECU 20 is carried out by the following processes; the valve bodies 7b pass through the corresponding penetration holes 52 of the solenoid-supporting member 50 and are combined with the corresponding solenoids 7a, and then the modulator block 31 are fastened to the ECU housing 21 by the bolts 24. In this state, the elastic members 60, 70 and 80 of the solenoid-supporting device 50 support the solenoids 7a in the state that the solenoids 7a are urged to the ECU housing 21, thereby preventing the solenoids 7a from creating the mechanical vibration and noise during operation.

As described above, because the solenoid-supporting device of an antilock brake system according to this invention, which is provided between the modulator block and the ECU housing to support the solenoids, has a relative large contact area with the solenoids and the modulator block, the heat, which is generated from the coils when the solenoid valves operate, is effectively radiated outside, thereby preventing the damage of the coils by the heat. Therefore, the antilock brake system has more improved reliability.

What is claimed is:

1. In an antilock brake system which comprises: brakes mounted on each wheel of a vehicle; a master cylinder for transmitting hydraulic oil to the brakes to generate a braking power; a plurality of solenoid valves for controlling the flow of the hydraulic oil supplied from the master cylinder, each of which comprises a solenoid for creating an electric field and a valve body for opening or closing an oil passage formed therein by interacting with the electric field created by the solenoid; an ECU for controlling the solenoid valves; a modulator block in which the valve bodies are mounted; an ECU housing joined to the bottom of the modulator block, in which the solenoids are mounted; and a solenoid-supporting device provided between the modulator block and the ECU housing for supporting the solenoids, the improvement wherein the solenoid-supporting device comprises:

a base metal plate contacting the bottom surface of the modulator block;

a plurality of penetration holes formed at the base metal plate in order that the valve bodies pass through the penetration holes and are combined with the solenoids; and a plurality of elastic members which are formed by extending from the base metal plate around the respective penetration holes, the elastic members urging the solenoids to the ECU housing while dissipating heat.

2. The solenoid-supporting device of the antilock brake system according to claim 1, wherein the elastic member extends from the base plate toward the solenoid, thereby displacing the penetration hole from a plane containing the base metal plate to a nearby plane parallel to the plane containing the base metal plate, the elastic member forming a portion of a cone between the plane containing the base metal plate and the plane containing the penetration hole, the axis of the cone intersecting the center of the penetration hole, the circle formed at the intersection of the cone and the plane containing the base metal plate having a plurality of slots along its perimeter, the circle formed at the intersection of the cone and the plane containing the penetration hole also having a plurality of slots along its perimeter thereby preventing deformation of the base metal plate during the forming of the elastic member and providing the elastic member has with good elasticity.

3. In an antilock brake system which comprises: brakes mounted on each wheel of a vehicle; a master cylinder for transmitting hydraulic oil to the brakes to generate a braking power; a plurality of solenoid valves for controlling the flow of the hydraulic oil supplied from the master cylinder, each of which comprises a solenoid for creating an electric field and a valve body for opening or closing an oil passage formed therein by interacting with the electric field created by the solenoid; an ECU for controlling the solenoid valves; a modulator block in which the valve bodies are mounted; an ECU housing joined to the bottom of the modulator block, in which the solenoids are mounted; and a solenoid-supporting device provided between the modulator block and the ECU housing for supporting the solenoids, the improvement wherein the solenoid-supporting device comprises: a base plate contacting the bottom surface of the modulator block; a plurality of penetration holes formed at the base plate in order that the valve bodies pass through the penetration holes and are combined with the solenoids; and a plurality of elastic members comprising: a vertical portion which is made by cutting out from the base plate, by which a slot is formed on the base plate, and bending the cut portion vertically toward the solenoid; and a horizontal portion which is made by further bending a portion of the vertical portion toward the slot so as to parallel with the top surface of the solenoid.

4. In an antilock brake system which comprises: brakes mounted on each wheel of a vehicle; a master cylinder for transmitting hydraulic oil to the brakes to generate a braking power; a plurality of solenoid valves for controlling the flow of the hydraulic oil supplied from the master cylinder, each of which comprises a solenoid for creating an electric field and a valve body for opening or closing an oil passage formed therein by interacting with the electric field created by the solenoid; an ECU for controlling the solenoid valves; a modulator block in which the valve bodies are mounted; an ECU housing joined to the bottom of the modulator block, in which the solenoids are mounted; and a solenoid-supporting device provided between the modulator block and the ECU housing for supporting the solenoids, the improvement wherein the solenoid-supporting device comprises: a base plate contacting the bottom surface of the modulator block; a plurality of penetration holes formed at the base plate in order that the valve bodies pass through the penetration holes and are combined with the solenoids; and a plurality of elastic members comprising: a vertical portion which is made by cutting out from the base plate, by which a slot is formed on the base plate, and bending the cut portion vertically toward the solenoid, and a horizontal portion which is made by further bending a portion of the vertical portion toward the outside of the slot so as to parallel with the top surface of the solenoid.

* * * * *